US006957893B2

(12) United States Patent
Basey

(10) Patent No.: US 6,957,893 B2
(45) Date of Patent: Oct. 25, 2005

(54) LOCKING DEVICE FOR A PROJECTOR COMPONENT

(75) Inventor: Gary Dennis Basey, Santa Rosa, CA (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/859,938

(22) Filed: Jun. 2, 2004

(65) Prior Publication Data

US 2004/0239896 A1 Dec. 2, 2004

Related U.S. Application Data

(60) Provisional application No. 60/475,243, filed on Jun. 2, 2003.

(51) Int. Cl.[7] ............................. G03B 21/14; G02B 7/02
(52) U.S. Cl. ....................................... 353/100; 359/818
(58) Field of Search .......................... 352/242; 353/100, 353/101; 359/818, 823; 396/523

(56) References Cited

U.S. PATENT DOCUMENTS

| | | | | | |
|---|---|---|---|---|---|
| 2,067,189 A | * | 1/1937 | Howell | ...................... | 396/529 |
| 2,625,077 A | * | 1/1953 | Goldberg | ..................... | 353/100 |
| 2,705,437 A | * | 4/1955 | Gerhard | ..................... | 353/100 |
| 3,241,439 A | * | 3/1966 | Kiner et al. | ................ | 353/101 |
| 3,596,954 A | * | 8/1971 | Hull et al. | .................. | 292/128 |
| 4,739,396 A | | 4/1988 | Hyatt | | |
| 4,804,215 A | * | 2/1989 | Bisbing | ..................... | 292/113 |
| 6,637,895 B2 | | 10/2003 | Fujimori et al. | | |

* cited by examiner

Primary Examiner—Christopher Mahoney
(74) Attorney, Agent, or Firm—Alleman Hall McCoy Russell & Tuttle LLP

(57) ABSTRACT

A projection device is provided with a locking device to couple a first optical component to a second optical component that is configured to be disposed adjacent to the first component to define an optical path. The locking device includes a latch mechanism and an alignment system. The latch mechanism may be coupled to the second component and may be configured to enable a user to manually couple the second component to the first component and to manually release the second component from the first component. The alignment system and the latch mechanism may be configured to cooperatively and releasably couple the second component to the first component in a predetermined orientation.

32 Claims, 2 Drawing Sheets

LOCKING DEVICE FOR A PROJECTOR COMPONENT

CROSS-REFERENCE TO RELATED APPLICATIONS

The present application claims priority under 35 U.S.C. § 119 to U.S. Provisional Patent Application Ser. No. 60/475,243, which was filed on Jun. 2, 2003. The disclosure of that application is hereby incorporated by reference in its entirety for all purposes.

TECHNICAL FIELD

The present disclosure relates generally to locking devices, and more specifically, to locking devices for components in a projection device.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
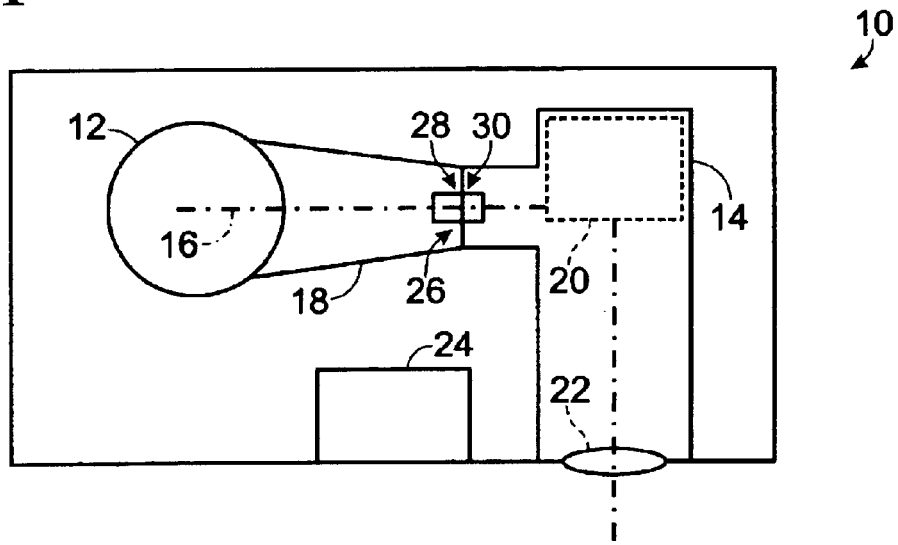
FIG. 1 is a schematic illustration of an exemplary projection device in which a locking device of the present disclosure may be implemented.

An exemplary projection device 10 is illustrated schematically in FIG. 1. Projection device 10 may be adapted to project an image on a display surface, including, but not limited to, a screen, a wall, or other viewing surface or area. As used herein, a projection device or image-generating device may include any suitable display device or image projector, including, but not limited to, a digital projector, a liquid crystal display (LCD) projector, a digital light processing projector, a rear projection device, a front projection device, etc.

As shown in FIG. 1, exemplary projection device 10 includes a light source 12 and an optical engine 14. Light source 12 may be adapted to produce a beam of light and project the light towards optical engine 14. Light produced from light source 12 may be channeled along an optical path 16 through an interface tube or spacer 18 to optical engine 14.

Optical engine 14 may be configured to generate an image to be projected. The optical engine may include filters, color wheels, lenses, mirrors, integrators, condensers, and other suitable optical elements. In some embodiments, optical engine 14 may include an image-producing element 20. Image-producing element 20 may include any suitable image-generation device, including, but not limited to, a digital micromirror (DMD), an LCD panel, or any other suitable image source. Image-producing element 20 may be configured to project light toward one or more mirrors or other optics, which, in turn, may be configured to reflect light toward a display surface. For example, the light may be directed through lens 22 of optical engine 14 to a display surface. Alternatively, image-producing element 20 may be configured to project light directly toward the display surface.

Projection device 10 typically includes one or more power sources 24. The power source may be linked to one or more components, such as, but not limited to, light source 14, image-producing element 20, and other components of projection device 10.

As described above, interface tube 18 may be interposed between light source 12 and optical engine 14. Interface tube 18 may be configured to reflect or otherwise direct the light along an optical path 16 from light source 12 to optical engine 14. In some embodiments, interface tube 18 may be adapted to receive a portion of the light source. In other embodiments, interface tube 18 may be coupled to light source 12.

As can be seen with reference to FIG. 1, exemplary projection device 10 includes many components that may interact to produce a projected image. Some of the various components may be releasably secured in projection device 10 in a manner that provides for accurate positioning, for example, after replacing or repairing a component, as well as, secure coupling between the components of projection device 10. Light source 12, optical engine 14, and interface tube 18 are examples of projection device components that are also optical components. Optical components, as used herein, include those components directly or indirectly involved in production or transmission of light or of an image.

Figure 2:
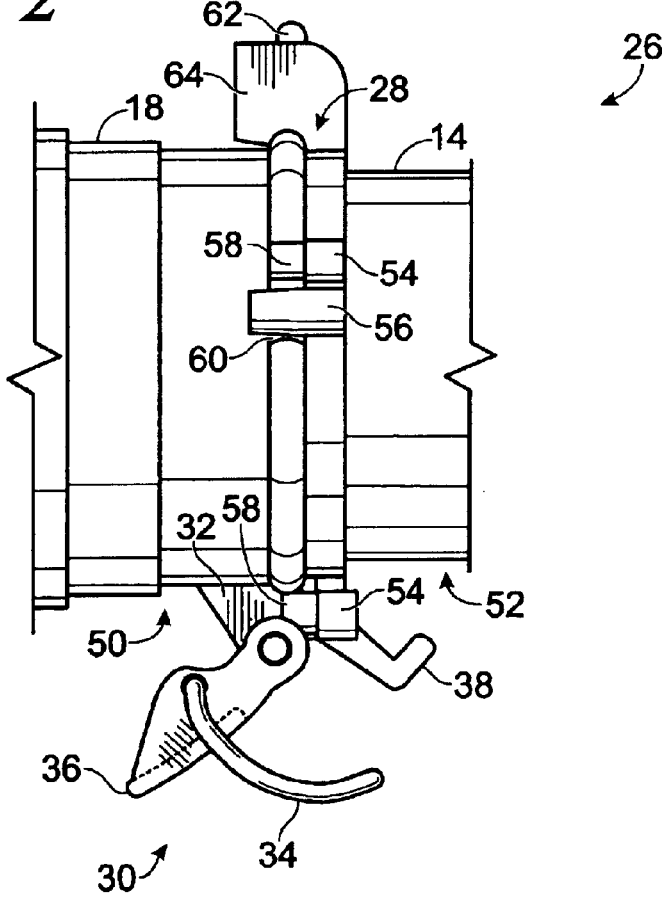
FIG. 2 is a side view of an interface tube and optical engine secured via an exemplary locking device.
Figure 3:
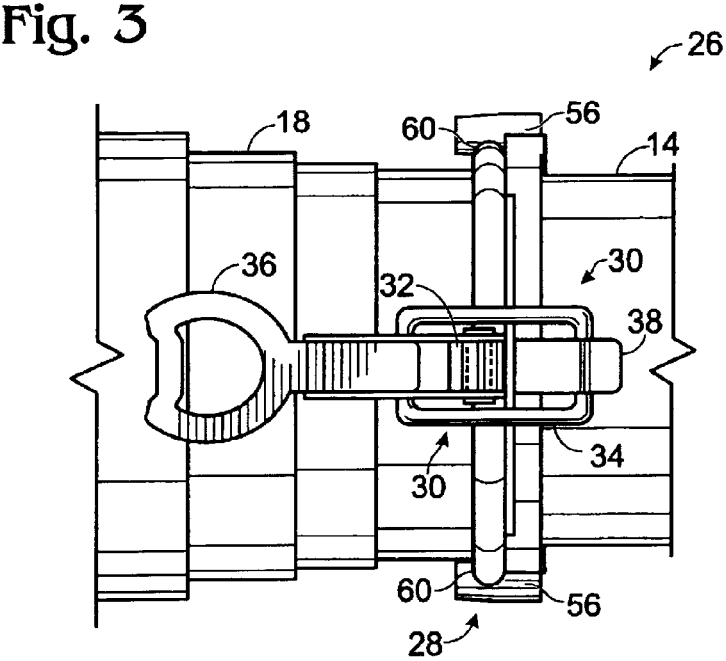
FIG. 3 is a bottom view of an exemplary latch mechanism shown in FIG. 2.

For example, light source 12 often includes a lamp (not shown) that may need to be replaced from time to time. Replacement of the lamp may be facilitated by removing or releasing interface tube 18 from a first position in projection device 10. In some embodiments, replacement of the lamp may be facilitated by separating interface tube 18 from light source 12. Projection device 10 may include an interface tube 18 with an easy-to-use locking device 26 that releasably couples a first optical component to a second component of projection device 10. One exemplary locking device 26 is shown in FIGS. 2–3. Locking device 26, as illustrated, may include an alignment system 28 or a latch mechanism 30.

Latch mechanism 30 may be any suitable easily releasable mechanism, including latch mechanisms such as the exemplary over-center latch mechanism of FIGS. 2 and 3. Latch mechanism 30 may be configured to releasably couple interface tube 18 to optical engine 14. With reference to FIGS. 2 and 3, an exemplary latch mechanism 30 may include a keeper 38 disposed on a first component (such as optical engine 14), a base 32 disposed on a second component (such as interface tube 18), a coupling arm 34 pivotally coupled to base 32, and an actuating lever 36 operatively associated with the coupling arm. It should be noted that base 32 and keeper 38 may be disposed on any two components that are configured to be disposed adjacent to one another. When latch mechanism 30 is used to couple optical engine 14 and interface tube 18, base 32 may be disposed on the interface tube as illustrated, or it may be disposed on optical engine 14 with keeper 38 disposed on interface tube 18.

Alternatively, latch mechanism 30 may be configured to couple two components together that are not immediately adjacent each other. For example, latch mechanism 30 may be configured with a longer coupling arm (not shown) to enable the coupling arm to span an intervening component (not shown) to couple with a keeper disposed on another component. In such a configuration, the intervening component may be secured in place by the pressure applied between the first and second component. For example, a longer coupling arm may be used in some embodiments when the intervening component is too small to support a base 32 or a keeper 38 or when the intervening component is fragile. Because the coupling arm may be configured to couple two components that are separated by an intervening component, the term adjacent should be understood to indicate two components that are capable of being securely coupled with a latch mechanism 30.

Returning to the example of an optical engine 14 coupled with an interface tube 18 shown in FIGS. 2 and 3, base 32 may be a separate member coupled to interface tube 18. Alternatively, base 32 and interface tube 18 may be a unitary structure where the base is part of the interface tube. Similarly, keeper 38 may be an integral part of optical engine 14 or it may be coupled to the optical engine.

Coupling arm 34 may be pivotally coupled to base 32 and may pivot between an unlatched orientation, shown in FIG. 2, and a latched orientation, shown in FIG. 3. Coupling arm 34 may be configured to couple with keeper 38 when the coupling arm is in the latched orientation. The coupling arm may include ridges, orifices, lips, or other structures to facilitate its coupling with keeper 38. Coupling arm 34 and keeper 38 may be designed to cooperatively secure interface tube 18 relative to optical engine 14 so there is no movement of the first relative to the second. Moreover, coupling arm 34 may be configured to enable interface tube 18 to be safely coupled to a relatively fragile optical assembly in optical engine 14 without significantly disturbing the optical assembly.

Actuating lever 36 of exemplary latch mechanism 30 may be operatively associated with coupling arm 34 to transition the coupling arm between the latched orientation and the unlatched orientation. Actuating lever 36 may be integral with coupling arm 34 forming one member. Alternatively, actuating lever 36 and coupling arm 34 may be separate members operatively associated. Latch mechanism 30 may be configured to prevent inadvertent movement of actuating lever 36. It will be appreciated that a variety of features may be provided to actuating lever 36, coupling arm 34, and/or base 32 to prevent inadvertent opening of latch mechanism 30.

It should be recognized that coupling arm 34 of exemplary latch mechanism 30 may be configured to provide the necessary tension to securely couple the first component and the second component, shown in FIGS. 2 and 3 as interface tube 18 and optical engine 14. Coupling arm 34 and actuating lever 36 of the exemplary latch mechanism 30 may be operatively associated to substantially eliminate the need for tools or user adjustment to secure interface tube 18 and optical engine 14. For example, actuating lever 36 may include a grip to facilitate actuation of the coupling arm with the user's hand. The grip may be large enough to be gripped between a thumb and a forefinger, as shown in FIG. 2, or it may include a larger surface or a loop, as shown in FIG. 3, which may be grasped by a user's hand.

In the exemplary embodiments shown in FIGS. 2–3, latch mechanism 30 is used to couple an interface tube 18 and an optical engine 14. In this exemplary embodiment, the necessary pressure to couple interface tube 18 to optical engine may be important to the operation of the projection device. As an example, if the pressure is too great, the delicate assemblies in optical engine 14 and interface tube 18 may be damaged. Alternatively, if the pressure is not great enough, an opening may form between optical engine 14 and interface tube 18 through which light may pass. However, it should be noted that the coupling between optical engine 14 and interface tube 18 is only an exemplary use for latch mechanism 30. In other applications where latch mechanism 30 couples two mating components of projection device 10, the precision of the coupling pressure may not be as important. It should be understood that the arrangement and configuration of base 32, keeper 38, coupling arm 34, and actuating lever 36 may be varied to suit the requirements of the various embodiments.

Although an over-center latch mechanism is described and illustrated, other types of latching devices and clamps may be used without departing from the scope of the disclosure. Specifically, the latch mechanism described herein includes a mechanism configured to enable a user to manually couple and release two components, such as interface tube 18 and optical engine 14. In some embodiments, latch mechanism 30 may be configured to enable a user to couple and release two components without using screws, screwdrivers, or other tools. Thus, the locking device described herein provides a quick attachment and release method enabling interface tube 18 to be easily and selectively attached/detached from optical engine 14.

As discussed above, latch mechanism 30 enables a user unfamiliar with the components of a projection device to easily remove a component from the projection device for repair or replacement and then properly secure the component in place when finished. Latch mechanism 30 may be utilized in portable projectors, fixed location projectors, televisions, monitors, and other image projection devices. As described in the exemplary embodiment where latch mechanism 30 is used to couple interface tube 18 to optical engine 14, latch mechanism 30 may facilitate the replacement of bulbs in portable projectors where the bulb may need to be replaced at unexpected times and in unexpected locations.

In some embodiments where locking device 26 is implemented in a projection device, the alignment of the mating components may affect the quality of the projected image. For example, misaligned components may result in escaping light or may result in light scattering. Locking device 26 of the present disclosure may include an alignment system 28. For example, interface tube 18 and optical engine 14 further may be configured to be easily positioned in a proper orientation relative to each other. Specifically, interface tube 18 and/or optical engine 14 may include one or more alignment features adapted to enable interface tube 18 to be properly positioned relative to optical engine 14 when the interface tube has been removed for repair or replacement. The alignment features also may be adapted to assist latch mechanism 30 in maintaining the proper alignment and orientation of interface tube 18 and optical engine 14 during use or movement of projection device 10.

Figure 4:
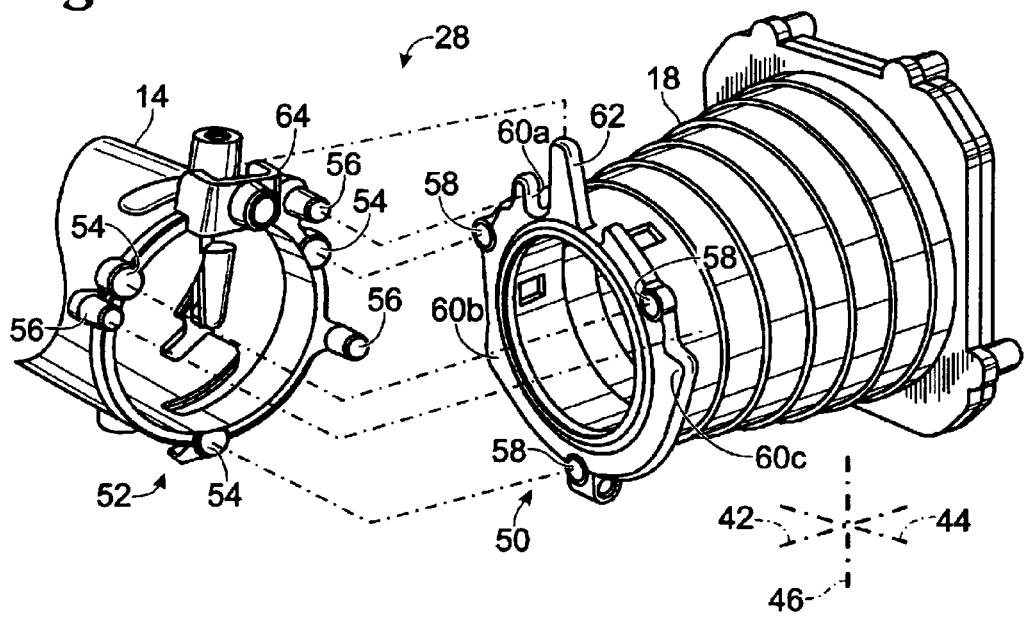
FIG. 4 is an exploded perspective view of an exemplary alignment system disposed on a first component and a second component of a projection device.

FIG. 4 illustrates one example of an alignment system 28 for use with two mating components, such as interface tube 18 and optical engine 14. Optical engine 14 is an example of a first component having a distal end and a proximal end and interface tube 18 is an example of a second component having a distal end and a proximal end. As shown in FIG. 4, the proximal end 50 of interface tube 18 is configured to be disposed adjacent to the proximal end 52 of optical engine 14. The first and second components are shown in FIG. 4 in an exploded view with the mating ends thereof turned towards the viewer.

Alignment system 28 includes alignment features on interface tube 18 that may be configured to mate with corresponding alignment features on optical engine 14. An exemplary, six-point locating system is shown in FIG. 4. The six-point locating system includes both z-axis alignment features and x-y axis alignment features. The z-axis 42 corresponds with the longitudinal axis of interface tube 18; the x- and y-axes 44, 46 correspond with the orthogonal transverse axes of the interface tube, as indicated in FIG. 4.

As shown in FIG. 4, exemplary alignment system 28 may include a plurality of first coupling pads 54 and a plurality of protrusions 56 disposed on proximal end 52 of optical engine 14. Alignment system 28 further may comprise a plurality of second coupling pads 58 and a plurality of detents 60 disposed on proximal end 50 of interface tube 18. Although the illustrated alignment system 28 may include three protrusions 56 and three first coupling pads 54 on optical engine 14 and three detents 60a, 60b, 60c and three second coupling pads 58 on interface tube 18, it should be appreciated that any number of coupling pads 54, 58, protrusions 56, and detents 60 may be used on one or more of the mating components.

As shown in FIG. 4, detents 60 need not be identical. For example, detent 60a near the top of interface tube 18 is configured as a recess into which a corresponding protrusion may be positioned. The remaining detents 60b, 60c may be configured as rests against which the corresponding protrusions may be positioned. Alternatively, detents 60 on interface tube 18 may include one or more orifices configured to receive corresponding protrusions 56 on optical engine 14.

In the exemplary alignment system 28, shown in FIG. 4, the mating of these twelve alignment features creates the six-point locating system described above. The three sets of mated coupling pads align the components in the z-axis while the three sets of mated protrusions and detents align the components in the x- and y-axes. It should be understood that a greater or fewer number of alignment features may be provided to optical engine 14 and interface tube 18 to ensure proper alignment in the three axial directions. It should also be understood that the protrusions and the detents may be reversed so that the detents are on optical engine 14 with the protrusions on interface tube 18.

The position of the alignment features around the circumference of interface tube 18 and optical engine 14 may enable a user to identify the proper orientation for the interface tube relative to the optical engine when the two components are being brought together. In some embodiments, the two components may additionally comprise a finger-ring association to assist the user in identifying the proper relationship between the two components. For example, a finger member 62 may be disposed on the proximal end of interface tube 18 and a ring assembly 64 may be disposed on the proximal end of optical engine 14. Finger member 62 may be an upright portion extending radially away from the circumference of interface tube 18. Finger 62 may be an integral part of interface tube 18 or it may be a separate member coupled to the interface tube. Ring member 64 may be configured to extend beyond proximal end 52 of optical engine 14, as shown in FIG. 4.

The finger-ring association may be configured so that the finger is loosely received into the ring while the user is aligning protrusions 56 and detents 60 of alignment system 28. In this manner, the finger-ring association may assist in coupling the two components with alignment system 28 and latch mechanism 30 described above. The finger-ring association may additionally be configured to participate as part of alignment system 28 providing a seventh point of contact between the two components to help maintain the proper alignment. The finger-ring association may also cooperate with latch mechanism 30 described above to assist the user in properly bringing the two components together for coupling.

It should be appreciated that although locking device 26, including latch mechanism 30 and/or alignment system 28, is described in relation to coupling interface tube 18 and optical engine 14, a similar locking device may be used to couple other optical components of a projection device. For example, latch mechanism 30 may be used to secure interface tube 18 to light source 12. Similarly, the alignment features may be used to orient other components of a projection device.

As discussed above, locking device 26 of the present disclosure, including an alignment system 28 and a latch mechanism 30, may be utilized in a projection device to couple two mating components. For example, locking device 26 may be used to couple a first optical component to a second optical component, particularly where the first component is movable in relation to the second. In some embodiments, locking device 26 may be utilized to couple two mating optical components when one or more of the components are configured to be temporarily removed from projection device 10, either for repair or replacement by a user or for maintenance of other parts of the projection device.

In an exemplary embodiment wherein locking device 26 couples an interface tube 18 and an optical engine 14, interface tube 18 and/or optical engine 14 may be configured to be repaired, replaced, or repositioned by the user. For example, interface tube 18 may need to be repositioned in projection device 10 by the user after removal to change the light bulb in light source 12. Alternatively, interface tube 18 itself may need to be repaired or replaced.

Locking device 26 may include alignment system 28 alone, latch mechanism 30 alone, or it may include both alignment system 28 and latch mechanism 30. In one exemplary embodiment where projection device 10 is configured to be portable, both alignment system 28 and latch mechanism 30 may be used. Latch mechanism 30 may facilitate repair and maintenance of the projection device by the user in the many circumstances in which a portable projector may be used. Alignment system 28 may assist the user in properly positioning the components within projection device 10 after performing the maintenance or repair. Additionally, alignment system 28 may assist in securing the components in the proper orientation when projection device 10 is subjected to diverse external forces.

For example, a portable projector may be subject to impacts from external forces from every imaginable direction. Alignment system 28 may help keep the components from shifting under such impacts. In other exemplary embodiments, projection device 10 may be configured to be utilized in high traffic areas where the projection device may be bumped by people or other equipment moving near the projection device. A projection device in these circumstances may be provided with an alignment system 28 to protect against the impacts. While a projection device configured to be used in a fixed or relatively fixed location may not need to be repaired in a diversity of places like a portable projector, a fixed location projection device may also be provided with a latch mechanism 30 to facilitate maintenance and repair. It should be understood that locking device 26 of the present disclosure may include an alignment system 28 alone, a latch mechanism 30 alone, or both an alignment system 28 and a latch mechanism 30.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device, comprising:

a first optical component;

a second optical component configured to be disposed adjacent to the first component defining an optical path, wherein the second component is movable relative to the first component:

a latch mechanism coupled to the second component and configured to enable a user to manually couple the second component to the first component and to manually release the second component from the first component; and an alignment system;

wherein the latch mechanism and the alignment system are configured to cooperatively and releasably couple the second component to the first component in a predetermined orientation; and wherein the latch mechanism comprises:

a keeper coupled to the first component;

a base coupled to the second component;

a coupling arm pivotally coupled to the base, having a latched orientation and an unlatched orientation, and configured to couple with the keeper when in the latched orientation; and an actuating lever operatively associated with the coupling arm to transition the coupling arm between the latched orientation and the unlatched orientation.

2. The projection device of claim 1, wherein the actuating lever and coupling arm are operatively associated to allow a user to manually transition the coupling arm between the latched orientation and the unlatched orientation.

3. The projection device of claim 2, wherein the first component includes an optical engine, and wherein the second component includes an interface tube.

4. The projection device of claim 2, wherein the actuating lever includes a grip configured to facilitate actuation of the lever by a user's hand.

5. The projection device of claim 1 wherein the first and second optical components are cylindrical.

6. The projection device of claim 1 including an alignment system configured to prevent lateral movement of the first and second components relative to each other.

7. The projection device of claim 1 wherein at least a portion of the first or optical component seats inside a portion of the second optical component or at least a portion of the second optical component seats inside a portion of the first optical component so as to prevent lateral movement of the components relative to each other.

8. A protection device, comprising:

a first optical component;

a second optical component configured to be disposed adjacent to the first component defining an optical path, wherein the second component is movable relative to the first component;

a latch mechanism coupled to the second component and configured to enable a user to manually couple the second component to the first component and to manually release the second component from the first component; and an alignment system;

wherein the latch mechanism and the alignment system are configured to cooperatively and releasably couple the second component to the first component in a predetermined orientation; and wherein the first component has a distal end and a proximal end and wherein the proximal end has a plurality of first coupling pads and a plurality of protrusions; wherein the second component has a distal end and a proximal end and wherein the proximal end has a plurality of second coupling pads and a plurality of detents; wherein the second component proximal end is configured to be disposed adjacent to the first component proximal end; and wherein the alignment system is provided by the plurality of protrusions, the plurality of detents, and the plurality of first and second coupling pads, wherein the plurality of detents on the second component are configured to operatively associate with corresponding protrusions on the first component to align the first and second component in x and y axes in a predetermined orientation, and wherein, when the protrusions are operatively associated with the detents, the plurality of first and second coupling pads are configured to maintain the first and second components in a predetermined spaced apart relationship in a z axis.

9. The projection device of claim 8, wherein the first component proximal end further comprises a ring, wherein the second component proximal end further comprises a finger, and wherein the finger is configured to be inserted into the ring as the second component proximal end is disposed adjacent to the first component proximal end.

10. The projection device of claim 8, wherein at least one of the plurality of detents on the second component proximal end includes a recess configured to receive a corresponding protrusion on the first component proximal end.

11. The projection device of claim 8, wherein the first component includes an optical engine, and wherein the second component includes an interface tube.

12. The projection device of claim 11, wherein the first component proximal end has three protrusions and three coupling pads and wherein the second component proximal end has three detents and three coupling pads.

13. A projection device, comprising:

a first optical component;

a second optical component configured to be disposed adjacent to the first component defining an optical path, wherein the second component is movable relative to the first component;

a latch mechanism coupled to the second component and configured to enable a user to manually couple the second component to the first component and to manually release the second component from the first component; and an alignment system;

wherein the latch mechanism and the alignment system are configured to cooperatively and releasably couple the second component to the first component in a predetermined orientation; and wherein the latch mechanism comprises:

a keeper disposed on the first component;

a base disposed on the second component;

a coupling arm pivotally coupled to the base, having a latched orientation and an unlatched orientation, and configured to couple with the keeper when in the latched orientation; and an actuating lever operatively associated with the coupling arm to transition the coupling arm between the latched orientation and the unlatched orientation.

14. The projection device of claim 13, wherein the base is an integral part of the second component.

15. The projection device of claim 13, wherein the keeper is an integral part of the first component.

16. The projection device of claim 13, wherein the actuating lever is an integral part of the coupling arm.

17. The projection device of claim 13, wherein the latch mechanism is configured to prevent inadvertent movement of the actuating lever.

18. The projection device of claim 13, wherein the actuating lever and coupling arm are operatively associated to allow a user to manually transition the coupling arm between the latched orientation and the unlatched orientation.

19. The projection device of claim 18, wherein the first component includes an optical engine, and wherein the second component includes an interface tube.

20. The projection device of claim 18, wherein the actuating lever includes a grip configured to facilitate actuation of the lever by a user's hand.

21. The projection device of claim 13, further comprising an alignment system configured to cooperate with the latch mechanism to releasably couple the second component to the first component in a predetermined orientation.

22. The projection device of claim 21, wherein the alignment system includes a plurality of first coupling pads and a plurality of protrusions on a proximal end of the first component and a plurality of second coupling pads and a plurality of detents on a proximal end of the second component; wherein the second component proximal end is configured to be disposed adjacent to the first component proximal end.

23. A projection device, comprising:

a first optical component having a distal end and a proximal end wherein the proximal end has a plurality of first coupling pads and a plurality of protrusions; and a second optical component having a distal end and a proximal end, wherein the proximal end has a plurality of second coupling pads and a plurality of detents, and wherein the second component proximal end is configured to be disposed adjacent to the first component proximal end defining an optical path;

wherein the second component is movable relative to the first component; wherein the plurality of detents on the second component are configured to operatively associate with corresponding protrusions on the first component to align the first and second components in x and y axes in a predetermined orientation; and wherein, when the protrusions are operatively associated with the detents, the plurality of first and second coupling pads are configured to maintain the first and second components in a predetermined spaced apart relationship in a z axis.

24. The projection device of claim 23, wherein the first component proximal end further comprises a ring, wherein the second component proximal end further comprises a finger, and wherein the finger is configured to be inserted into the ring as the second component proximal end is disposed adjacent to the first component proximal end.

25. The projection device of claim 23, wherein at least one of the plurality of detents on the second component proximal end includes a recess configured to receive a corresponding protrusion on the first component proximal end.

26. The projection device of claim 23, wherein the first component includes an optical engine, and wherein the second component includes an interface tube.

27. The projection device of claim 26, wherein the first component proximal end has three protrusions and three coupling pads, and wherein the second component proximal end has three detents and three coupling pads.

28. The projection device of claim 23, further comprising a latch mechanism coupled to the second component and configured to enable a user to manually couple the second component to the first component and to manually release the second component from the first component.

29. The projection device of claim 28, wherein the latch mechanism comprises:

a keeper disposed on the first component;

a base disposed on the second component;

a coupling arm pivotally coupled to the base, having a latched orientation and an unlatched orientation, and configured to couple with the keeper when in the latched orientation; and an actuating lever operatively associated with the coupling arm to transition the coupling arm between the latched orientation and the unlatched orientation.

30. A projection device, comprising:

a first optical component:

a second optical component configured to be disposed adjacent to the first component defining an optical path, wherein the second component is movable relative to the first component;

a latching means for enabling a user to manually couple the second component to the first component and to manually release the second component from the first component; and an alignment means for cooperating with the latching means to releasably couple the second component to the first component in a predetermined orientation;

wherein the alignment means includes a plurality of first spacing means and a plurality of protruding means on a proximal end of the first component and a plurality of second spacing means and a plurality of positioning means on a proximal end of the second component; wherein the second component proximal end is configured to be disposed adjacent to the first component proximal end.

31. The projection device of claim 30, wherein the latching means comprises:

a keeper means disposed on one of the first component and the second component;

a base means disposed on the other of the first component and the second component;

a coupling means pivotally coupled to the base, having a latched orientation and an unlatched orientation, and configured to couple with the keeper means when in the latched orientation; and an actuating means operatively associated with the coupling means to transition the coupling means between the latched orientation and the unlatched orientation.

32. A locking device for use in a projection device, comprising:

a latch mechanism including a keeper; a base; a coupling arm pivotally coupled to the base, having a latched orientation and an unlatched orientation, and configured to couple with the keeper when in the latched orientation; and an actuating lever operatively associated with the coupling arm to transition the coupling arm between the latched orientation and the unlatched orientation; and an alignment system including a plurality of first coupling pads, a plurality of corresponding second coupling pads, a plurality of protrusions, and a plurality of corresponding detents; wherein the latch mechanism is configured to allow a user to manually transition the coupling arm between the latched orientation and the unlatched orientation.

* * * * *